Aug. 30, 1949.  R. C. GILBERT  2,480,725
ADJUSTABLE SCALE
Filed Jan. 20, 1947
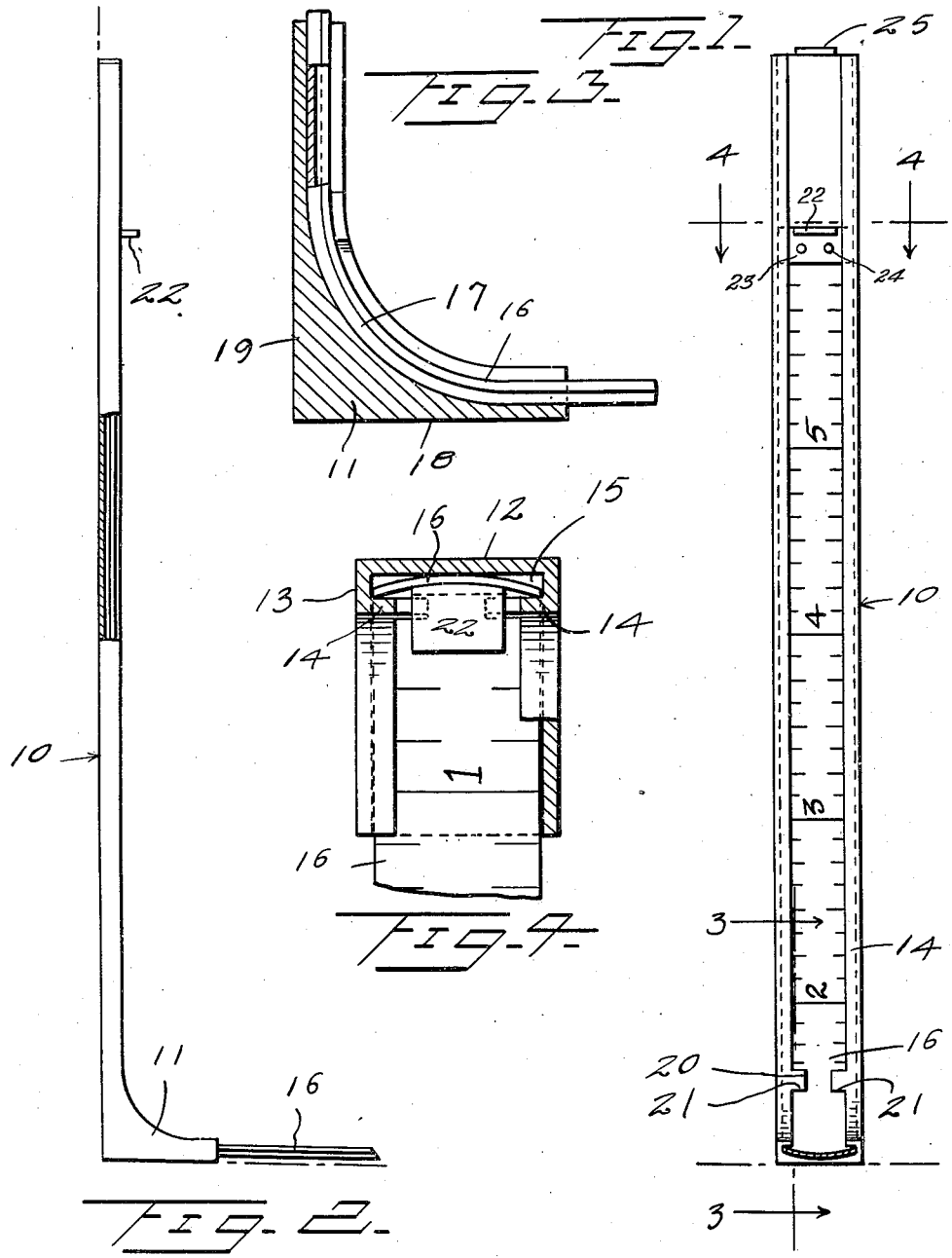
Inventor
R. C. Gilbert
By Kimmel & Crowell
Attorneys Patented Aug. 30, 1949

2,480,725

UNITED STATES PATENT OFFICE 2,480,725

ADJUSTABLE SCALE

Richard C. Gilbert, Whittier, Calif.

Application January 20, 1947, Serial No. 722,995

1 Claim. (Cl. 33—137)

This invention relates to measuring devices.

An object of this invention is to provide a device for measuring distances in hard-to-get-at places, such as interiors or the like.

The device herein disclosed embodies an extensible scale which is slidably mounted in a holder which constitutes a handle, the scale being movable into or out of the holder so that one end or the holder may be placed at one point and the scale then extended to the other point, and the exact distance between the two points being read on the lower portion of the holder.

A further object of this invention is to provide a measuring device of this kind which includes a transversely curved scale which in its extended position from the holder will assume a normal straight position so that the distance between two points can be easily and accurately measured.

With the above and other objects in view, my invention consists in the arrangement, combination and details of construction disclosed in the drawing and specification, and then more particularly pointed out in the appended claim.

In the drawing,

Figure 1 is a detail front elevation, partly in section, of a measuring device constructed according to an embodiment of this invention, Figure 2 is a detail side elevation, partly broken away and in section, of the device, Figure 3 is a fragmentary sectional view taken on the line 3—3 of Figure 1, Figure 4 is a fragmentary sectional view taken on the line 4—4 of Figure 1.

Referring to the drawing, the numeral 10 designates generally a handle of elongated configuration which is formed at one end thereof with a right angularly extending foot member 11. The handle or scale retaining member 10 is formed of an elongated flat bar 12, having right angular flanges 13 extending from the lengthwise edges thereof, and the flanges 13 have extending from the forward edges thereof confronting flanges 14 forming a scale guiding channel 15 within which a scale 16 is adapted to slidably engage.

The scale 16 is of bendable material, being formed of tempered steel or the like and is curved in transverse section so that when any portion of the scale is extended from the foot 11, as will be hereinafter described, the extended portion of the scale will stand out in a straight line from the foot 11. The foot 11 is also formed with a channel 17 communicating with the channel 15, the channel 17 being of arcuate configuration and opening at the forward end of the foot 11. The foot 11 is formed with a lower straight edge 18 which is at right angles to the rear edge 19 of the handle 10, and the straight edge 18 is adapted to be parallel with the extended portion of the scale 16.

In order to provide a means whereby the scale 16 will be limited in its movement outwardly of the foot 11, I have provided a pair of confronting lugs 20 which extend inwardly from the flanges 14. The lower edges 21 of the lugs 20 form an indicating means correlated with the numerals on the scale 16 so that the exact distance from the lower end of the scale 16 can be accurately determined.

The scale 16 has fixed thereto a lug 22 formed with a base plate 23 secured by fastening means 24 to the upper end of the scale 16. The lug 22 is adapted to abut against the lug 20 when the scale 16 is moved downwardly to the limit of its extension from the foot member 11.

A stop lug 25 is disposed at the upper end of the channel member 10 to prevent the scale 16 from being pulled out. When the lug 22 abuts the stop 25, the scale 16 is entirely within the channel member.

In the use of this scale, the foot member 11 is adapted to abut at its outer or rear edge against one point and the scale 16 is then moved downwardly until the free end thereof abuts against or is at the other point between which the measurement is to be taken. The correct measurement between the two points may then be read at the indicating edge 21 of each lug 20.

This scale is designed for measuring distances between two points where the distances are in interiors or at hard-to-get-at places. With a scale as hereinbefore described, the correct distances between two points can be easily and accurately determined by merely extending the scale 16 from the foot member 11 and then reading the distance on the scale 16 at the indicating edge 21 of each lug 20. Measurements in confined places can also be made by extending the scale 16 from the channel member and reading the measurement on the extended end of the scale 16.

I do not mean to confine myself to the exact details of construction herein disclosed, but claim all variations falling within the purview of the appended claim.

What I claim is:

A measuring device comprising a substantially L-shaped member, a channel in each leg of said member extending lengthwise thereof, a curved channel formed on a fixed radius and communicating at the opposite ends thereof with said channels in said legs, a normally straight bendable elongated scale member slidably carried in said channels and extendable at one end thereof at right angles to the vertical leg of said L-shaped member, a lug carried by the other end of said scale member and projecting outwardly of the channel in said vertical leg, stop means carried by said vertical leg engageable with said lug for limiting the sliding movement of said scale member in one direction, the bottom edge of said stop means being positioned at a distance from the outlet end of said channel, measured along said channel, equal to the horizontal distance from said outlet end to the heel of said L-shaped member, whereby, said bottom edge will provide index means for indicating the distance from said one end of said scale member to the heel of said L-shaped member.

RICHARD C. GILBERT.

REFERENCES CITED

The following references are of record in the file of this patent:

UNITED STATES PATENTS

| Number | Name | Date |
|---|---|---|
| 745,357 | Lanham | Dec. 1, 1903 |
| 2,347,273 | Lyle | Apr. 25, 1944 |

FOREIGN PATENTS

| Number | Country | Date |
|---|---|---|
| 835,389 | France | Sept. 19, 1938 |